United States Patent
Jogand-Coulomb et al.

(10) Patent No.: US 9,514,141 B2
(45) Date of Patent: Dec. 6, 2016

(54) MEMORY DEVICE AND METHOD FOR CONTENT VIRTUALIZATION

(75) Inventors: Fabrice E. Jogand-Coulomb, San Carlos, CA (US); Robert Chin-Tse Chang, Danville, CA (US)

(73) Assignee: SanDisk Technologies LLC, Plano, TX (US)

( * ) Notice: Subject to any disclaimer, the term of this patent is extended or adjusted under 35 U.S.C. 154(b) by 1215 days.

(21) Appl. No.: 12/005,728

(22) Filed: Dec. 28, 2007

(65) Prior Publication Data

US 2009/0172281 A1    Jul. 2, 2009

(51) Int. Cl.
*G06F 12/02* (2006.01)
*G06F 17/30* (2006.01)
*G06F 12/14* (2006.01)

(52) U.S. Cl.
CPC ... *G06F 17/30115* (2013.01); *G06F 17/30218* (2013.01); *G06F 17/30233* (2013.01); *G06F 12/1458* (2013.01)

(58) Field of Classification Search
None
See application file for complete search history.

(56) References Cited

U.S. PATENT DOCUMENTS 6,208,991 B1    3/2001    French et al.
6,823,417 B2 *  11/2004   Spencer ..................... 710/305
7,945,734 B2 *  5/2011    Lahcanski et al. ........... 711/115
2006/0184673 A1* 8/2006  Liebman ...................... 709/225
2006/0242068 A1  10/2006  Jogand-Coulomb et al.
2007/0043667 A1  2/2007   Qawami et al.

OTHER PUBLICATIONS

Michael Holtzman, Ron Brazilai, Rotem Sela, Fabrice Jogand-Coulomb, "Content Control Method Using Certificate Chains", filed Nov. 6, 2006 as U.S. Appl. No. 11/557,028.
Fabrice Jogand-Coulomb and Robert Chang, "Memory Device and Method for Content Virtualization," filed May 11, 2010 as U.S. Appl. No. 12/777,385.
Fabiice Jogand-Coulomb and Robert Chang, "Memory Device and Method for Content Virtualization," filed May 11, 2010 as U.S. Appl. No. 12/777,399.

(Continued)

*Primary Examiner* — Christian P Chace
*Assistant Examiner* — Eric Loonan
(74) *Attorney, Agent, or Firm* — Brinks Gilson & Lione

(57) ABSTRACT

A memory device and method for content virtualization are disclosed. In one embodiment, a plurality of directories are created in the memory of the memory device, wherein each of the plurality of directories points to a same storage location of the digital content. In another embodiment, a first header for the digital content is stored in each of the different directories, wherein the first header comprises information about where to find the digital content in the memory. In yet another embodiment, the memory device comprises circuitry that receives an identification of a host device in communication with the memory device and reorganizes a directory structure of the memory in accordance with the identification of the host device, wherein the reorganization results in the digital content appearing to be located in a directory expected by the host device.

18 Claims, 4 Drawing Sheets

(56) References Cited

OTHER PUBLICATIONS

Office Action for U.S. Appl. No. 12/777,385, dated Jun. 23, 2010, 10 pages.
Office Action for U.S. Appl. No. 12/777,385, dated Dec. 28, 2010, 10 pages.
Office Action for U.S. Appl. No. 12/777,399, dated Jun. 23, 2010, 10 pages.
Office Action for U.S. Appl. No. 12/777,399, dated Dec. 28, 2010, 11 pages.
Bach, The Design of the UNIX Operating System, System Calls for the File System, Sections 5.15 ("Link") and 5.16 ("Unlink"), pp. 128-137, 1986.
Office Action for U.S. Appl. No. 12/777,385, dated Jun. 24, 2011, 12 pages.
Office Action for U.S. Appl. No. 12/777,399, dated Jun. 22, 2011, 12 pages.

* cited by examiner

MEMORY DEVICE AND METHOD FOR CONTENT VIRTUALIZATION

BACKGROUND

Many mobile devices, such as mobile phone handsets, allow a user to insert a memory card to, among other things, play digital content pre-loaded on the memory card. There are many different manufacturers of mobile phone handsets. As a result, different handsets may expect to find certain digital content in different folders. For example, one handset may expect to find digital music in a directory titled "Music," while another handset may expect to find digital music in a directory titled "Songs." If the digital content is not placed in the directory where a particular handset is expecting it, the handset may not be able to find and play the digital content stored on the memory card. Accordingly, pre-loaded memory cards are usually handset-specific or targeted to mobile devices with open operating systems that have a mechanism to browse the entire memory card and find digital content. Recently, handsets have been introduced that scan the entire memory card for music and video files. Accordingly, these files are made accessible to the handset irrespective of what directory the files are stored in. However, such handsets do not scan for other forms of digital content, such as web pages and pictures. Accordingly, those other forms of digital content need to be stored in pre-defined directory structures and, therefore, suffer from the same problems noted above.

SUMMARY

The present invention is defined by the claims, and nothing in this section should be taken as a limitation on those claims.

By way of introduction, the embodiments described below provide a memory device and method for content virtualization. In general, the memory devices in these embodiments are configured to be connectible to a plurality of host devices, wherein each of the plurality of host devices expects the digital content to be stored in a different directory. In one embodiment, a plurality of directories are created in the memory of the memory device, wherein each of the plurality of directories points to a same storage location of the digital content. In another embodiment, a first header for the digital content is stored in each of the different directories, wherein the first header comprises information about where to find the digital content in the memory. In yet another embodiment, the memory device comprises circuitry that receives an identification of a host device in communication with the memory device and reorganizes a directory structure of the memory in accordance with the identification of the host device, wherein the reorganization results in the digital content appearing to be located in a directory expected by the host device. Other embodiments are provided, and each of these embodiments can be used alone or in combination with one another.

The embodiments will now be described with reference to the attached drawings.

DETAILED DESCRIPTION OF THE PRESENTLY

Preferred Embodiments

Figure 1:
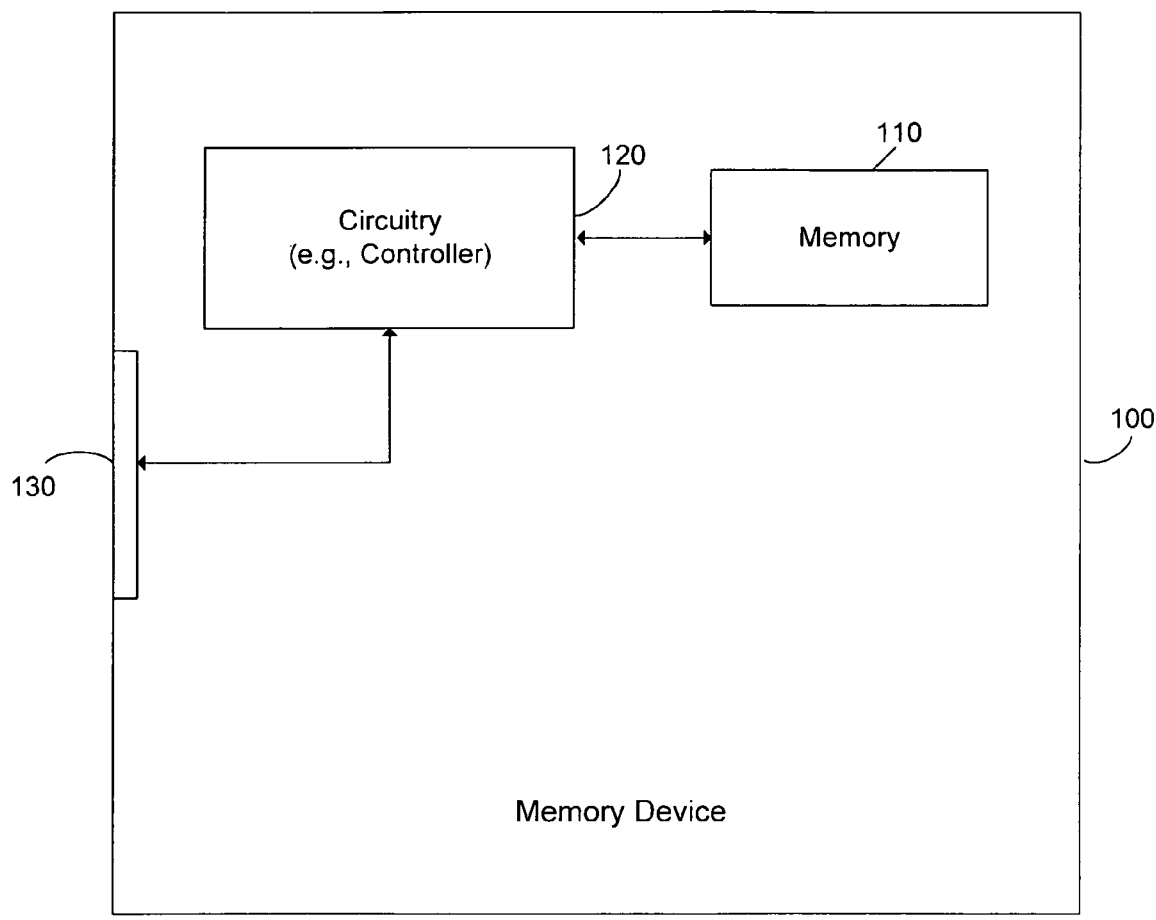
FIG. 1 is a block diagram of a memory device of an embodiment.

Turning now to the drawings, FIG. 1 is an illustration of a memory device 100 of an embodiment. As shown in FIG. 1, the memory device 100 comprises a memory 110, circuitry 120, and a connector 130 configured to connect the memory device 100 to any one of a plurality of host devices. The memory device 100 can take any suitable form and, in one embodiment, takes the form of a memory card, such as an SD, CF, TrustedFlash, or megaSIM card. The memory 110 in the memory device 100 can take any suitable form, such as, but not limited to, a non-volatile solid-state memory (e.g., flash memory), optical memory, and magnetic memory, and can be one-time programmable, few-time programmable, or many-time programmable. The memory 110 is operative to store digital content. "Digital content" can take any suitable form, such as, but not limited to, audio (e.g., a song, spoken word, a podcast, one or a series of sounds, etc.), video (with or without accompanying audio) (e.g., a movie, an episode of a TV show, a news program, etc.), still or moving images (e.g., a picture, a computer-generated display, etc.), text (with or without graphics) (e.g., an article, a text file, etc.), a web page, and a hybrid multi-media presentation of two or more of these forms. In a presently preferred embodiment, the digital content takes the form of a web page or picture, which are forms of digital content that are not currently searchable by current mobile handsets. As digital content can take any suitable form, the claims should not be read as requiring a specific type of digital content unless explicitly recited therein.

The circuitry 120 can include one or more components and can be a pure hardware implementation and/or a combined hardware/software (or firmware) implementation. Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. As shown in FIG. 1, the circuitry 120 is in communication with the connector 130. As used herein, the phrase "in communication with" means directly in communication with or indirectly in communication with through one or more components, which may or may not be shown or described herein. The host device to which the memory device 100 is connectable to can take any suitable form, such as a mobile device (e.g., a mobile phone handset), a game device, a personal digital assistant (PDA), an email/text messaging device, a digital camera, a digital media player, a card reader of a personal computer, etc. To illustrate these embodiments, the host device will take the form of a mobile phone handset. Of course, other host devices can be used.

As mentioned in the Background section above, different host devices, such as mobile handsets, expect certain digital content to be stored in different directories. For example, one mobile handset may expect to find digital pictures in a directory titled "Pictures," while another handset may expect to find digital pictures in a directory titled "Images." If the digital content is not placed in the directory where a particular host device is expecting it, the host device may not be able to find and render the digital content stored on the memory device 100. This effectively reduces the portability of digital content stored on the memory device 100. The following embodiments allow preloading a single set of digital content that would show in the expected directories of multiple host device, thereby making stored digital content more portable. These embodiments will be illustrated below and in conjunction with FIGS. 2-4. It is important to note that any of the embodiments described herein can be used alone or in combination with one another. Further, the examples set forth below are merely used to illustrate these embodiments and are not intended as a limitation on the claims.

Figure 2:
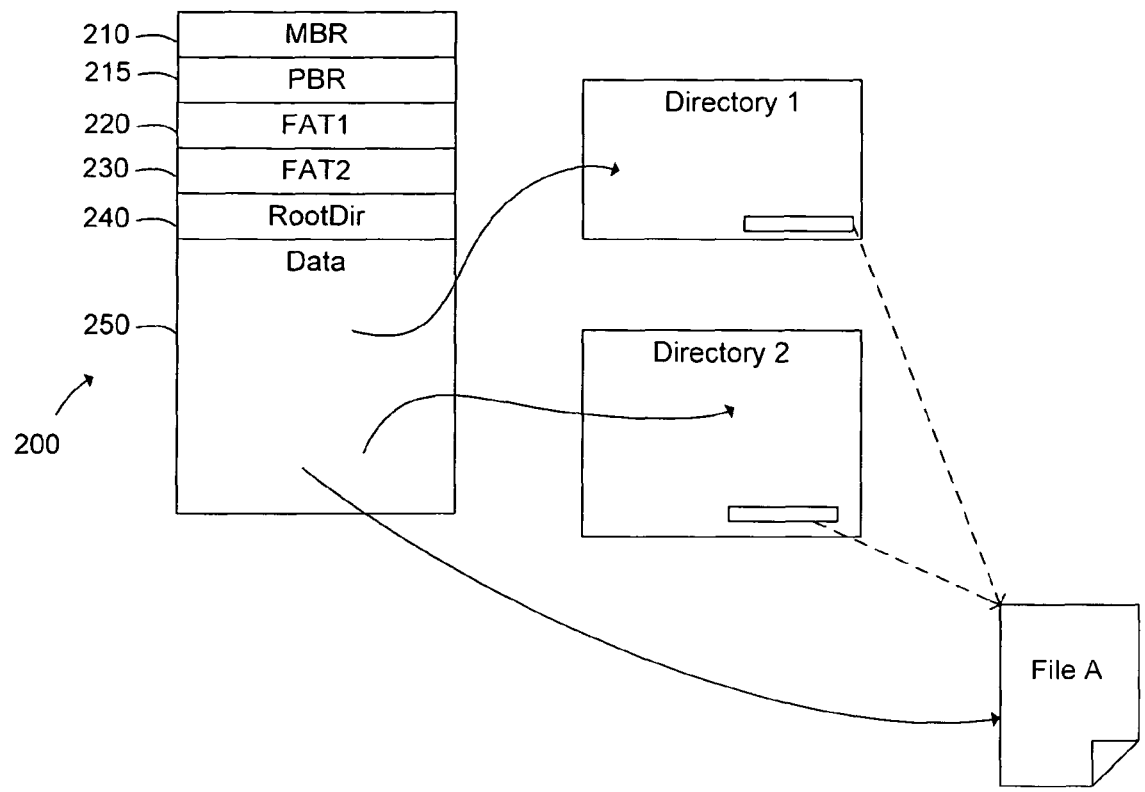
FIG. 2 is an illustration of a memory organization of an embodiment.

Turning first to FIG. 2, FIG. 2 shows a memory organization 200 of an embodiment. The memory 110 stores a master boot record (MBR) 210, a partition boot record (PBR) 215, two copies of a file allocation table (FAT1 and FAT2) 220, 230, a root directory (RootDir) 240, and a data portion 250. In general, the MBR 210 contains information that can be used by the circuitry 120 at startup of the memory device 100 to locate the PBR. The PBR contains information to locate the FATs 220, 230 and root directory 240. A FAT is a table structure that stores a chain of blocks in use by a file and also stores information on which blocks are free and which blocks are bad. Two copies of the FAT are typically stored for redundancy purposes. The root directory 240 links descriptive information about a file (e.g., its name, size, attributes, etc.) with information stored in the FAT about its physical location in the memory device.

As shown in FIG. 2, the data portion 250 stores a digital content file named "File A." In this embodiment, assume there are two host devices of interest (of course, more than two host devices may be of interest), and that Host Device 1 expects File A to be in Directory 1, and Host Device 2 expects File A to be in Directory 2. If several directories each with File A were created on the memory device 100, the memory device 100 would soon run out of available space, especially if tens or hundred of directories were needed for tens or hundreds of digital content files. Accordingly, in this embodiment, a plurality of directories (here, Directory 1 and Directory 2) are created in the memory 110 of the memory device 100, wherein each of the plurality of directories (Directory 1 and Directory 2) points to a same storage location of File A, as shown by the boxes in Directory 1 and Directory 2 pointing to File A. Accordingly, in this embodiment, pre-loaded content would be loaded onto the memory device 100, Directory 1 and Directory 2 would be created to point to the same content (File A).

This embodiment works especially well with pre-loaded, read-only digital content. However, a difficulty can arise if the digital content can be deleted. For example, if Host Device 1 issues a command to delete File A, the pointer to File A in Directory 1 would be deleted, but the pointer to File A in Directory 2 would still be present. In other words, since Host Device 1 is not aware of the "trick" being played by the memory device 100, it would not know to delete the pointer in Directory 2. An issue may arise on host devices that check the validity of the FAT and sees that the FAT 220, 230 is corrupt, as some files point to the cluster entry in the FAT table that are not allocated because of the "deletion." Fortunately, mobile handsets and other "small" host devices may not check the validity of the FAT, as the validation process can be complex. In any event, it is presently preferred that this embodiment be used either with a write-protected memory device or read-only digital content to avoid the problems discussed above. However, it should be understood that this embodiment can be used in other environments.

Figure 3:
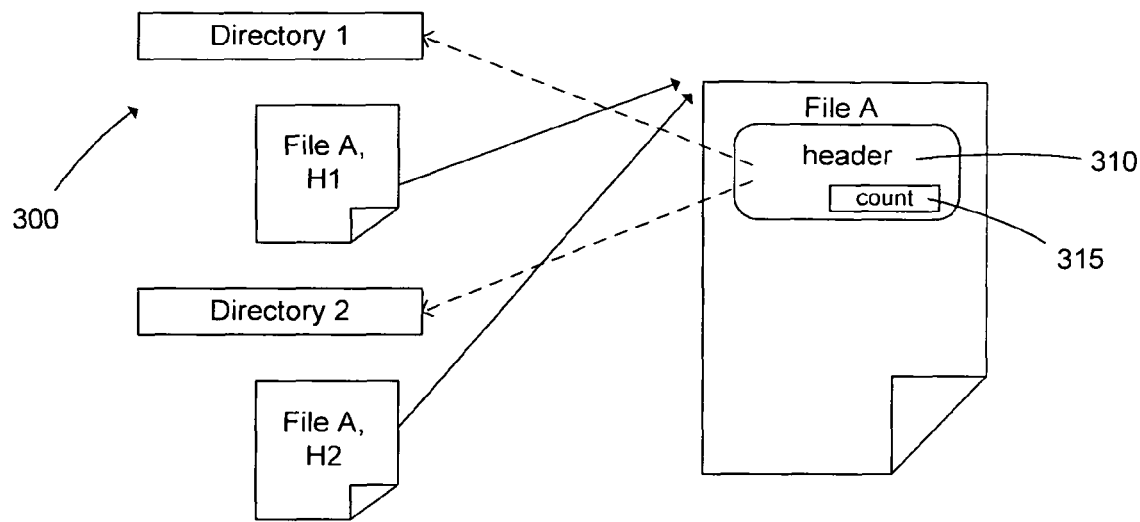
FIG. 3 is an illustration of a memory organization of an embodiment.

Turning now to FIG. 3, FIG. 3 shows a memory organization 300 of another embodiment. In this embodiment, instead of using a pointer in each directory, as in the embodiment shown in FIG. 2, the digital content in this embodiment is divided into a header and a body. The header for the digital content is stored in each directory and contains information about where to find the body in the memory 110. Accordingly, as shown in FIG. 3, Directory 1 contains a file entry pointing to a file which contains only a header H1 for File A that contains information on how to find File A in the memory 110. Likewise, Directory 2 contains a file entry pointing to a file which contains only a header H2 for File A that contains similar information. If additional directories were used for additional host devices, additional headers would be loaded into those additional directories. Although this embodiment can be used with any digital content, it is particularly useful with protected digital content, which already has a header and a ciphered body. In such a situation, the header could contain a location of an encryption key and other digital rights management (DRM) specific information.

Additionally, in this embodiment, the digital content itself contains a second header 310 that comprises a list of the different directories where the first header(s) are present. This avoids the difficult discussed above when the digital content is deleted by permitting an update to directories when the digital content is erased on a compliant system. For example, when Host Device 1 issues a command to delete File A for all directories, instead of merely deleting the header H1 in Directory 1 (i.e., the directory that Host Device 1 expects File A), the list in the second header 310 in File A would be read to determine in what other directories (here, Directory 2) additional headers (here, header H2) need to be deleted. The header 310 also contains a "count" 315 for how many files are linked to File A. Thus, if Host Device 1 issues a command to delete File A in directory H1 only, the count 315 is reduced by 1, the header H1 is deleted, and the directory entry in header 310 is deleted. When the count 315 is decremented to 0 (i.e., all linked file headers H1, H2, etc. have been deleted), File A is deleted as well.

Figure 4:
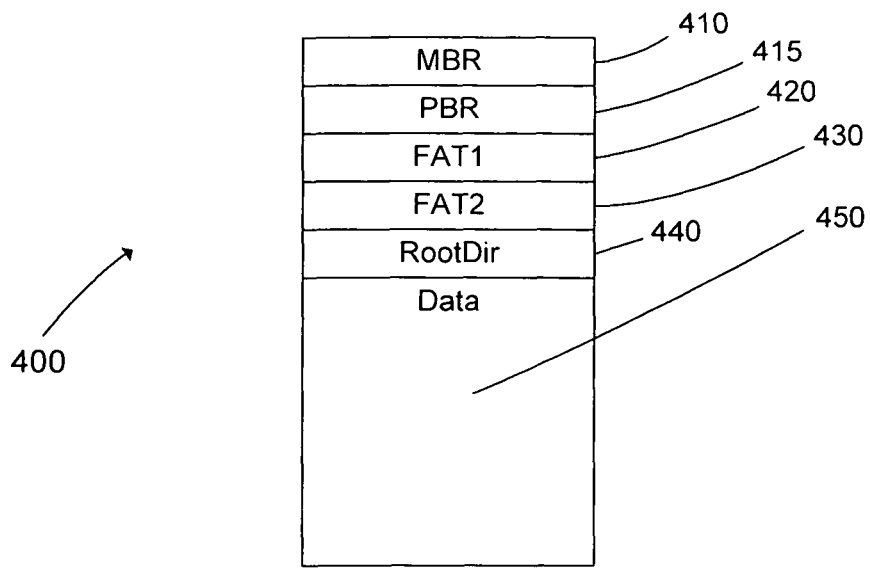
FIG. 4 is an illustration of a memory organization of an embodiment.

Returning to the drawings, FIG. 4 is an illustration of a memory organization 400 of another embodiment. As with the embodiment shown in FIG. 2, in this embodiment, the memory 110 stores a master boot record (MBR) 410, two copies of a file allocation table (FAT1 and FAT2) 420, 430, a root directory (RootDir) 440, and a data portion 450. However, in this embodiment, the circuitry 120 receives an identification of a host device in communication with the memory device 100 and reorganizes a directory structure of the memory 110 in accordance with the identification of the host device, preferably before the memory device 100 becomes available for use to the host device. This reorganization results in the digital content appearing to be located in a directory expected by the host device. For example, the memory device 110 can determine the handset model of a host device and show a directory structure to that host device that is compliant with the one expected by the host device.

The reorganization mentioned above can be done physically, with the circuitry 120 reorganizing the directory entry or FATs 420, 430. For example, "rename" the directory "music" to "audio" for the handsets which only search the "audio" directory for audio content. Alternatively, the reorganization can be done virtually, with the circuitry 120 emulating the appropriate file allocation tables. By being "smart enough" to understand directory and FAT and either emulate the directory and FAT when the dedicated area is read by the host or physically update the FAT, the circuitry 120 can load the appropriate configurations onto the memory device 100 on-the-fly. Because this embodiment does not face the "deletion" problem noted above and does not require the use of headers, this embodiment can be used with any type of digital content (e.g., pre-loaded or not pre-loaded, protected or not protected, read only or not read only). However, this embodiment finds particular advantage in environments in which memory cards with pre-loaded content are distributed at promotional events, since portability of digital content stored in the card is especially desired in that environment.

There are many alternatives that can be used with these embodiments. For example, as mentioned above, the memory device 100 can take the form of a megaSIM card. In general, megaSIM card is a smart mobile storage platform that provides advanced security features and processing power that can enable the delivery of new services and mobile content to subscribers. When a megaSIM card is used, it would also carry directory information for the handset and synchronize with the memory card to reorganize the content accordingly. As another example, when the digital content stored in the memory 110 takes the form of protected content, a TrustedFlash™ architecture from SanDisk Corporation can be used to store the decryption keys and licenses in a hidden partition in memory, while storing the encrypted content in a public (or hidden) partition in memory. Further information about TrustedFlash™ can be found in U.S. patent application Ser. No. 11/314,411 (published as U.S. patent publication 2006/0242068A1), Ser. Nos. 11/557,028, and 11/322,812 (published as U.S. patent publication 2007/0043667A1), which are assigned to the assignee of the present application and hereby incorporated by reference. Of course, other mechanisms can be used.

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method for storing digital content in a memory device, the method comprising:
   in a removable memory card having a card connector directly physically attachable to only a single mobile handset at any given time:
      storing digital content in a memory of the removable memory card, where each of a plurality of different mobile handsets that are capable of being attached to the removable memory card expects the digital content to be stored in a different directory; and
      creating a plurality of directories in the memory of the removable memory card, wherein each of the plurality of directories comprises a pointer that points to a same storage location of the digital content;
      wherein each of the plurality of directories comprises a different directory name that is titled according to a same specific type of the digital content accessed by the mobile handsets.

2. The method of claim 1, wherein digital content comprises pre-loaded digital content.

3. The method of claim 1, wherein the digital content comprises read-only content.

4. The method of claim 1, wherein the removable memory card comprises a write-protected memory card.

5. The method of claim 1, wherein the digital content comprises a web page, or a picture, or both.

6. The method of claim 1, where the same specific type comprises music.

7. The method of claim 1, where the same specific type comprises video.

8. The method of claim 1, where the same specific type comprises images.

9. The method of claim 1, where the same specific type comprises a multimedia presentation.

10. A removable memory card comprising:
   a card connector configured to directly physically attach the removable memory card to only a single mobile handset at any given time; and
   a memory in communication with the card connector, the memory storing digital content and a plurality of directories;
   wherein each of a plurality of different mobile handsets that are capable of being attached to the removable memory card expects the digital content to be stored in a different directory; and
   wherein each of the plurality of directories comprises a pointer that points to a same storage location of the digital content and wherein each of the plurality of directories comprises a different directory name that is titled according to a same specific type of the digital content accessed by the mobile handsets.

11. The removable memory card of claim 10, wherein digital content comprises pre-loaded digital content.

12. The removable memory card of claim 10, wherein the digital content comprises read-only content.

13. The removable memory card of claim 10, wherein the removable memory card comprises a write-protected memory card.

14. The removable memory card of claim 10, wherein the digital content comprises a web page, a picture, or both.

15. The removable memory card of claim 10, where the same specific type comprises music.

16. The removable memory card of claim 10, where the same specific type comprises video.

17. The removable memory card of claim 10, where the same specific type comprises images.

18. The removable memory card of claim 10, where the same specific type comprises a multimedia presentation.

* * * * *